United States Patent

[11] 3,610,474

| [72] | Inventors | Charles S. Usher;<br>John A. Keller, both of Bucyrus, Ohio |
|---|---|---|
| [21] | Appl. No. | 864,095 |
| [22] | Filed | Oct. 6, 1969 |
| [45] | Patented | Oct. 5, 1971 |
| [73] | Assignee | Shunk Manufacturing Co., Inc.<br>Bucyrus, Ohio |

[54] MATERIAL CONVEYOR AND SPREADER
8 Claims, 9 Drawing Figs.

[52] U.S. Cl. .................................................. 222/178,
222/371, 222/415
[51] Int. Cl. .......................................................... A01c 15/00
[50] Field of Search ............................................ 198/168;
222/415, 178, 371, 408; 239/687

[56] References Cited
UNITED STATES PATENTS

| 2,244,414 | 6/1941 | Arndt .......................... | 239/687 X |
| 2,748,993 | 6/1956 | Forrest ........................ | 222/415 |
| 2,988,368 | 6/1961 | Kerr ............................. | 239/687 X |

FOREIGN PATENTS

| 992,186 | 7/1951 | France ......................... | 198/168 |

Primary Examiner—Samuel F. Coleman
Attorney—J. H. Slough

ABSTRACT: A chain and flight conveyor is provided at the bottom of a truck-mounted hopper, the conveyor comprising parallel endless chains connected by substantially Z-shaped flights. Material is conveyed by the Z-shaped flights toward one end of the hopper and deposited upon a spinner disposed adjacent thereto.

INVENTOR.
CHARLES S. USHER
JOHN A. KELLER
BY
J. H. SLOUGH
ATTORNEY

INVENTOR.
CHARLES S. USHER
JOHN A. KELLER
BY
J. H. SLOUGH
ATTORNEY

PATENTED OCT 5 1971
3,610,474
SHEET 3 OF 3
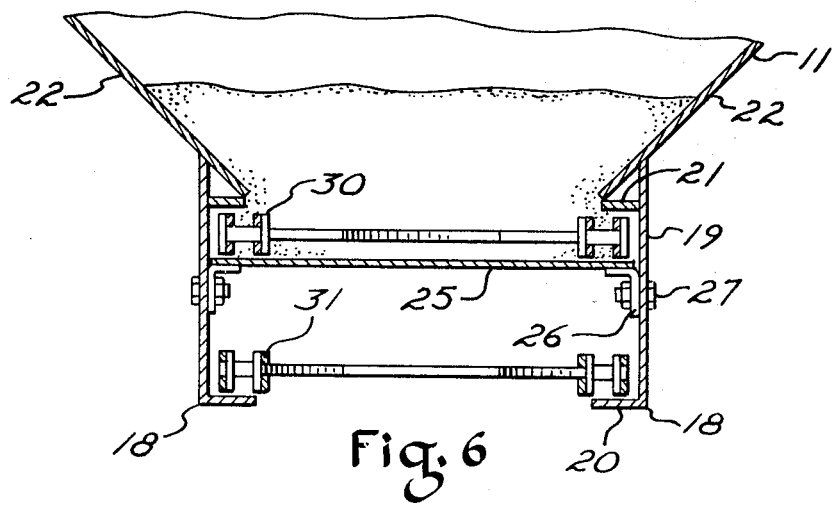
Fig. 6
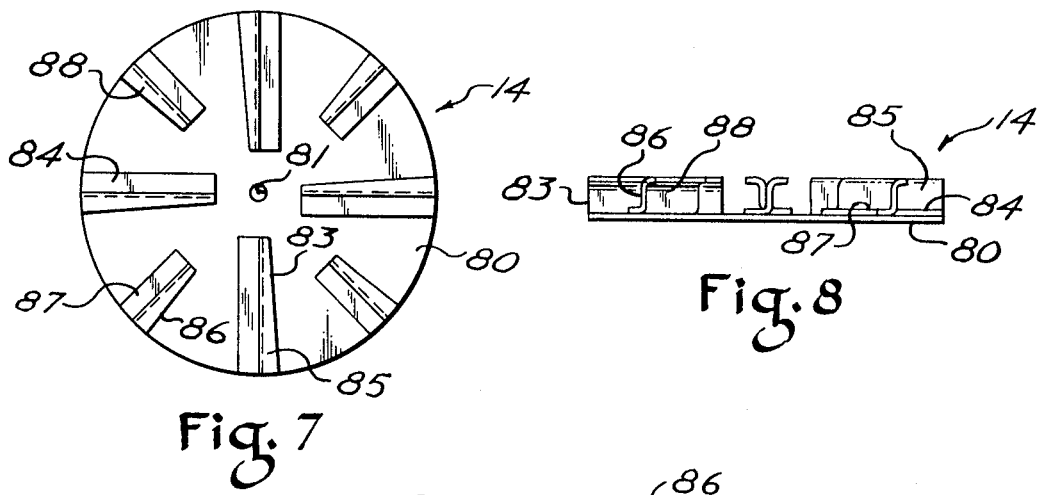
Fig. 7
Fig. 8
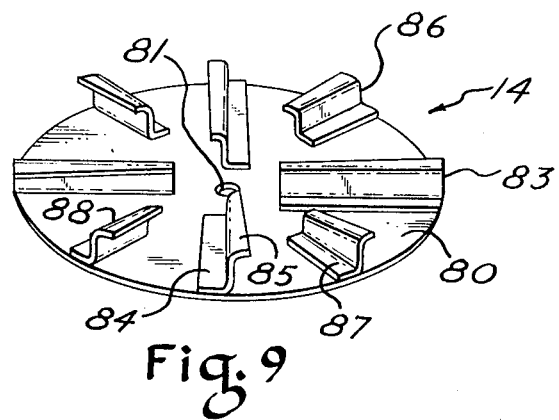
Fig. 9
INVENTOR.
CHARLES S. USHER
JOHN A. KELLER
BY
J. H. SLOUGH
ATTORNEY

3,610,474

MATERIAL CONVEYOR AND SPREADER

This invention relates to a material conveyor and spreader adapted to be used with a truck-mounted hopper for spreading granular material such as salt, sand, cinders, or the like on a roadway.

Vehicles adapted for spreading material on streets and highways for the purpose of combating the hazards of ice, snow, and other traction reducing substances are well known. Such vehicles commonly comprise a truck having a hopper mounted thereon and a rotating spinner mounted at one end of the hopper for dispersing the material in a circular or semicircular pattern. In certain constructions a chain and flight type conveyor is provided in the bottom of the hopper, said conveyor being longitudinally disposed with respect to the truck and hopper whereby the material is conveyed toward one end of the hopper and dropped onto the spinner. The conveyor comprises parallel, endless chains connected by transverse flights which progressively move the material toward the spinner. The spinner commonly comprises a rotating disk disposed in a generally horizontal plane and provided with upwardly directed, radially disposed fins. The material is dropped from the end of the conveyor onto the rotating disk and is scattered and dispersed by the rotating fins.

The present invention comprises a material conveyor and spreader of the above type which embodies substantial improvements over known constructions. One of the problems encountered when using chain and flight type conveyors of conventional design is a periodic pause or hesitation in delivery of the material onto the spinner. The result is that the material is dropped onto the spinner in uneven portions and scattered in varying degrees of intensity upon the roadway. Thus it may be that certain parts of the road are inadequately covered while other parts receive more material than is necessary to combat the hazard involved.

Another problem which is encountered in conventional material spreaders concerns the spinner and its effect upon the even spread of the material. Conventional spinners commonly use four or six fins. Assuming that the spinner rotates at 1 revolution per second, there is a definite time lapse between each fin reaching a fixed point on the spinner arc of travel. If the disk has only four fins, the time lapse is 0.25 of a second; if the disk has six fins, the time lapse is 0.166 of a second.

Means presently in use to attain a more uniform flow and spread of the material include increasing the speed of the conveyor by means of costly sprockets and chains or lowering the gear reduction thereby causing a power loss. These expedients are commonly used in conjunction with a narrow restricting door at the end of the hopper to prevent overflow. Another approach to the problem involves increasing the number of flights thereby reducing the distance between them and consequently reducing the pauses in material flow. However, the latter approach increases both the cost and weight or the conveyor.

With regard to the spinner, the speed thereof may be increased to improve the uniformity of spread, but this results in overthrowing of the material and must be controlled by additional costly deflectors.

The present invention provides a solution to the above problems by providing a conveyor with substantially Z-shaped flight bars so designed that the most forwardly projecting portion of one flight bar is substantially closer to the most rearwardly projecting portion of the adjacent flight bar than the transverse centerlines of the bars are to each other. Thus the effective distance between the flight bars is reduced to even out the rate of delivery without increasing the number of flight bars. This also allows the conveyor to be operated at normal slow speed, high gear reduction, and high power. The flight bars of the present invention also approach the material at an angle thereby cutting through said material more smoothly and reducing clumping or excessive buildup in front of each bar. Such conveyor can be used with a full width door opening at the end of the hopper and is equally effective whether running forwardly or backwardly. It has been found that the Z-shaped flight bars eliminate 60 percent of the pause in delivery which exists in conventional chain and flight type conveyors.

The present invention also provides an improved spinner having eight alternately long and short curved fins which reduce the time lapse between each fin reaching a fixed point on the spinner arc. This reduction in time lapse has proved to be most beneficial in causing the material to be spread uniformly as it is received from the conveyor.

In view of the foregoing, it is the general object of this invention to provide material conveyor and spreader means which will convey and spread grandular material more uniformly than spreader mechanisms heretofore known.

Another object of the invention is to provide a conveyor which substantially reduces the amount of pause commonly found in chain and flight type conveyors.

Still another object of the invention is to provide a high powered, slow moving conveyor for delivering material at a uniform rate.

Yet another object of the invention is to provide a conveyor having flight bars which cut through the material more smoothly than known flight bars.

A further object of the invention is to provide improved flight bars which reduce clumping and excessive buildup of material in front of the bars.

A still further object of the invention is to provide a conveyor as set forth above which operates equally well whether rum forwardly or backwardly.

Another object of the invention is to provide an improved spinner which effects a more even spread pattern of the material than known spinner constructions.

The overall object of the present invention is to provide a high powered, slow moving, durable, and economic conveyor means of the type set forth above for delivering granular material or the like from a hopper onto the roadway, and spreading the same uniformly, without the aid of additional devices to speed up the conveyor or spinner or the addition of flight bars or extra deflectors.

Other objects and advantages of the present invention will be apparent from the following description of one embodiment of the invention illustrated in the accompanying drawings in which:

FIG. 6 is a transverse section taken along the line 6—6 of FIG. 4;

FIG. 7 is a top plan view on an enlarged scale of the spinner shown in FIGS. 1 and 2;

FIG. 8 is a side or edge view of the spinner of FIG. 7; and

FIG. 9 is a perspective view of the spinner of FIGS. 7 and 8.

Figure 1:
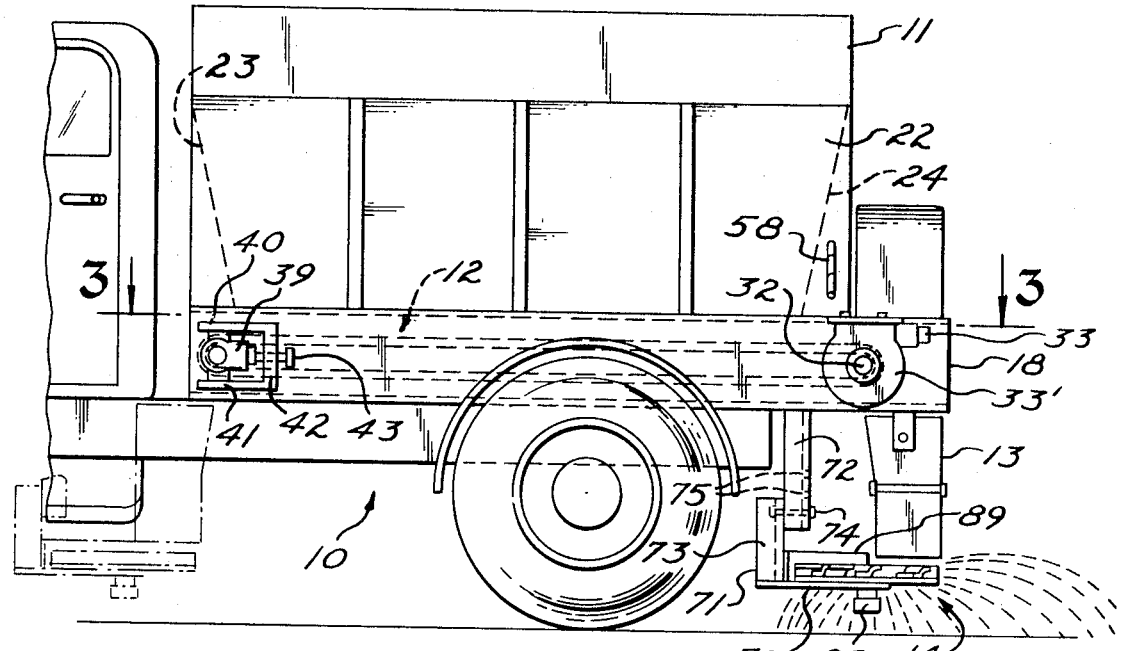
FIG. 1 is a side elevational view of the rear portion of a truck incorporating therein the material conveyor and spreader of this invention.

Referring now to the drawings in all of which like parts are designated by like reference numerals, the present invention as herein illustrated is incorporated in a truck 10 having a hopper 11 mounted upon the rear end portion thereof. A chain and flight type conveyor 12 is mounted in the bottom of the hopper 11 for conveying material longitudinally of the centerline of the truck toward one end of side hopper. A material drop box 13 is mounted just below the rearmost end of the conveyor 12, and material dispersing means in the form of a spinner 14 is mounted just below the material drop box 13. It will be understood that in operation of the truck 10, the hopper 11 is filled with a suitable granular material such as salt, sand, or cinders, which said material is conveyed by the conveyor 12 at the bottom of the hopper in a rearward direction to be deposited into the material drop box 13. Material dropping through said drop box impinges upon the spinner 14 which is rotated to spread the material in a circular or semicircular umbrella pattern.

Figure 2:
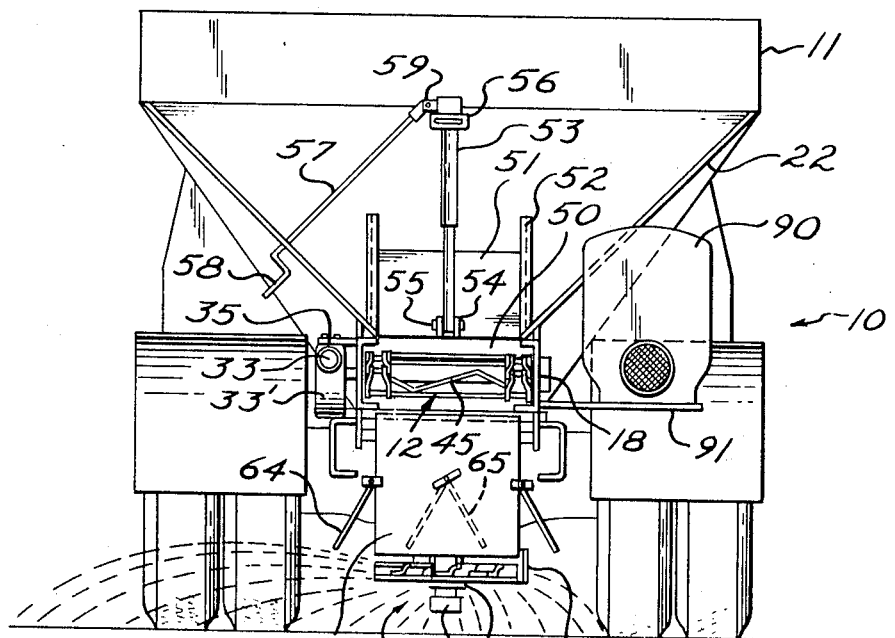
FIG. 2 is a rear elevational view of the truck of FIG. 1.

Referring now particularly to FIGS. 1, 2, and 6, the hopper 11 preferably comprises a pair of base frame members 18 having laterally spaced, vertically positioned walls 19 extending lengthwise along the frame of the truck above the rear wheels. Inturned flanges 20 are provided along the lower edges of the walls 19 by means of which the base frame members 18 are mounted in any suitable manner to the truck frame. The hopper 11 has downwardly converging sidewalls 22 which inwardly overlap the upper edges of the base frame walls 19 and are suitably secured thereto by any suitable means such as welding. Longitudinally disposed, horizontal flange strips 21 project inwardly from upper end portions of the walls 19 and have their inner edges welded or otherwise suitably secured to the lower edges of the sidewalls 22. As shown in dotted line in FIG. 1, the hopper 10 is also provided with front and rear walls 23 and 24, respectively, which also converge downwardly adjacent to the ends of the conveyor 12. A bottom wall is provided for the hopper in the form of an elongated, horizontal plate 25 which is spaced downwardly below the flange strips 21 and is welded or otherwise suitable secured to angle brackets 26 which are, in turn, secured to the case frame walls 19 by nut and bolt assemblies 27.

Figures 3, 4, 5:
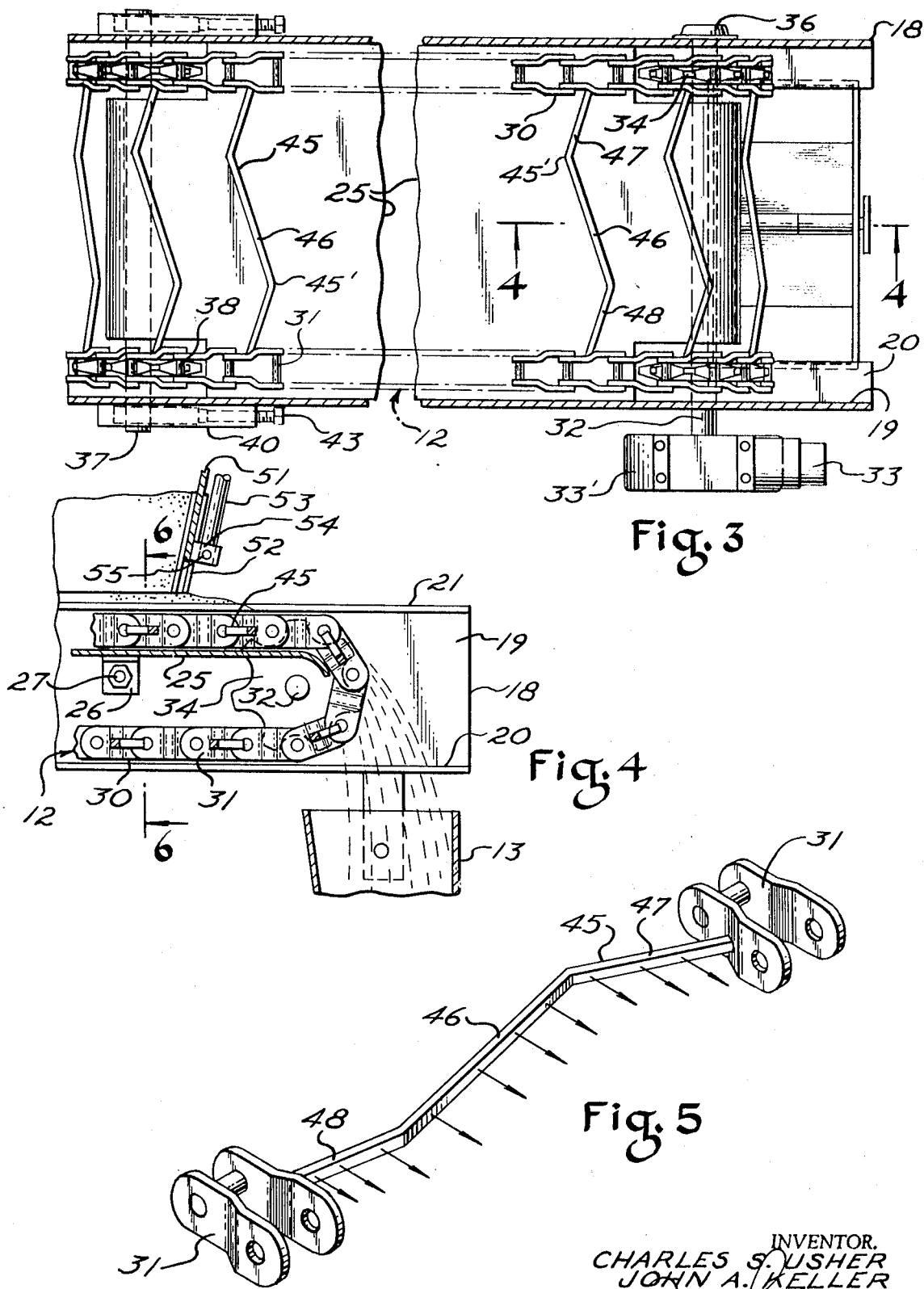
FIG. 3 is a horizontal section on an enlarged scale taken along the line 3—3 of FIG. 1 showing a top plane view of the conveyor.
FIG. 4 is a longitudinal section taken along the line 4—4 of FIG. 3.
FIG. 5 is a perspective view on a further enlarged scale of a flight bar of the conveyor, the same having a conveyor chain link secured to each end thereof.

The conveyor 12 as best shown in FIGS. 3 and 4, comprises a pair of parallel, endless sprocket chains 30 made up of a multiplicity of separate links 31. The rear end of the conveyor is provided with a driven shaft 32 driven by a motor 33 and reduction box 33' and carrying a pair of drive sprockets 35 engaging the rearwardly directed loops of the endless chains. The motor 33 is bolted or otherwise suitably secured to an outwardly projecting, horizontal mounting plate 35 (FIG. 1) carried by one of the base frame members 18 at one side of the truck. The drive shaft 32 engages the motor 33 at one end thereof and is suitably mounted at the other end in a bearing 36 in the opposite base frame member 18. The forward end of the conveyor 12 is carried by a driven shaft 37 carrying driven sprockets 38 and journaled at the end thereof in movable bearing 39. The movable bearing 39 are mounted for sliding movement longitudinally of the truck in takeup mounts 40 fixed to the outer sides of the base frame members 18. Said takeup mounts are U-shaped and have forwardly projecting horizontal arms 41 connected together at the rearward ends thereof by yokes 42. The movable bearings 39 are adapted to slide longitudinally of the truck between the arms 41 and are adjustably moved therein by bolts 43 thread fitted into the yokes 42 and abutting said movable bearings.

The endless chains 30 are connected transversely to each other by substantially Z-shaped flights 45 which connect alternate links in each chain to alternate links in the other chain. The lines 31 which carry the flights 45 are disposed directly opposite to each other, and each flight 45 comprises a substantially long, transversely skewed central portion 46 and oppositely angled end portions 47 and 48. Each end portion 47 is secured to a link in one endless chain and each end portion 48 is secured to a link in the other endless chain. When disposed at the upper level of the conveyor, the Z-shaped flights lie in a horizontal plane with apices 45' of the angles formed between the portions 46, 47, and 46, 48 being directed forwardly and rearwardly, respectively.

The above described conveyor construction substantially reduces the objectionable pauses in material delivery characteristic of conveyors of this type. By referring to FIGS. 3 and 5, it will be noted that although the flights 45 as shown are only provided on every other link 31 in each endless chain, the effective distance between the flights in substantially reduced by the apices 45' which project forwardly and rearwardly of the transverse centerline of each flight. Also, each portion 46, 47, and 48 of each flight approaches the material obliquely whereby the material is moved by each flight over a greater distance lengthwise of the conveyor than would be possible with straight flights of the prior art. Thus, as shown in FIG. 5 by the arrows X, each flight 45 is simultaneously pushing some material ahead of other material being moved by the same flight. This causes the material to be delivered to the discharge end of the hopper in a substantially continuous flow without adding to the number of flights.

As best shown in FIG. 6, the upper level of the conveyor runs above the bottom plate 25 and just below the horizontal flange strips 21 at the bottom of the downwardly converging sidewalls 22 of the hopper 11. The lower or return level of the conveyor is disposed below the plate 25 and just above the inturned flanges 20 of the base frame members 18. Thus the granular material in the hopper is gravity fed down to the bottom plate 25 over and around the flights 45 whereby as the conveyor moves, said material is delivered along the plate 25 toward the rear end of the hopper.

As herein illustrated, the expanded Z-shaped flights 45 are preferably five-eighths inch square bars shaped as above described. However, it is anticipated that flight bars of differing cross-sectional size may be utilized if desired.

As best seen in FIG. 2, the rear wall 24 of the hopper 11 is provided with an opening 50 which extends transversely the full width of the conveyor 12. The opening 50 is provided with a door 51 which slides upwardly and downwardly in door guides 52 carried by the end wall 24. Means for adjusting the door vertically is provided in the form of a screw type jack 53 connected at its lower end to said door by means of outstanding lugs 54 of the door and nut and bolt assembly 55. The upper end of said jack is secured to the wall 24 by a bracket 56. Means for rotating the jack comprise an elongated shaft 57 projecting through a portion of one of the sidewalls 22 which projects rearwardly beyond said rear wall 24. The shaft 57 is provided with a crank 58 outwardly of the wall 22, and the inner end of said shaft is connected to the upper end of the jack 53 by means of a universal joint 59 whereby rotation of the crank 58 will actuate the jack 53 in a well-known manner.

As best seen in FIG. 1, the base frame members 18 project rearwardly beyond the rearmost end of the hopper 11 and are provided with depending, parallel supports 62 between which the material drop box 13 is pivotally mounted adjacent to its upper end by pivot pins or bolts 63. Said material box is generally rectangular in horizontal section and as shown in FIG. 2 is provided with pivoted side deflectors 64 and pivoted internal deflectors 65 by means of which the material dropped through said box can be controlled as to the pattern with which it impinges on the rotating spinner 14.

Referring now particularly to FIGS. 1, 2, and 7-9, the spinner 14 is mounted upon a horizontal support plate 70 cantilevered rearwardly from the bottom edge of a vertically adjustable hanger assembly 71. As herein disclosed, said hanger assembly comprises a vertically depending, fixed bar 72 secured in any suitable manner to the base frame member 18. A vertically adjustable bar 73 is connected in overlapping relationship with the lower end portion of the fixed bar 72 by means of nut and bolt assembly 74. It will be understood that the fixed bar 72 is provided with a plurality of vertically spaced apertures 75 whereby the adjustable bar 73 can be mounted at various levels with respect to said fixed bar.

Referring now particularly to FIGS. 7-9, the spinner 14 comprises a disk 80 rotatably mounted upon the support plate 70. Said disk is centrally apertured at 81 to receive the drive shaft of a motor 82 carried below the support plate 70. The upper surface of the disk 80 carries a plurality of fins which are adapted to disperse the material in an umbrella pattern as shown in FIGS. 1 and 2. As herein illustrated, there are four evenly spaced long fins 83 each comprising a flat base portion 84, welded or otherwise suitable secured to the disk and an upwardly directed blade portion 85 which is curved at its upper edge in one circumferential direction of the disk. Between each adjacent pair of long fins 83, the disk 80 is provided with relatively short fins 86 having flat base portions 87 secured to the disk and upwardly directed blade portions 88 which are also curved in the same circumferential direction as the blade portions 85 of the longer fins 83. Thus the disk 80 is provided with alternating, circumferentially evenly spaced, long and short fins all of which carry blade portions projecting upwardly, and curved in the same circumferential direction.

The spinner 14 is adapted to rotate in the direction toward which the blades are curved and is so positioned that the material from the material drop box impinges upon the spinner rearwardly and radially outwardly with respect to the axis of the spinner. The material impinging upon the upper surface of the disk 80 is gathered by the rotating blades and projected outwardly in an umbrella pattern. To ensure that the pattern of the spread will be rearwardly and laterally of the truck rather than forwardly under the wheels thereof, an arcuate baffle 89 is disposed around a portion of the spinner. As herein disclosed, the baffle 89 extends from the right side of the spinner as seen in FIG. 2 around to the front portion thereof whereby the spread is directed primarily rearwardly and toward the left side of the truck. It will be readily understood that said baffle may be positioned anywhere around the spinner to attain the desired spread pattern.

The motor 33 driving the reduction box 33' of the conveyor and the motor 82 driving the spinner 14 may be of any suitable type and, as herein disclosed, are hydraulic motors. These motors may be driven from a primary hydraulic system of the truck (not herein illustrated); however, the hopper, conveyor, and spinner preferably constitute an independent unit by providing an auxiliary engine and pump assembly indicated at 90 in FIG. 2. Such engine and pump assembly as herein illustrated is mounted directly to one of the base frame members 18 by a cantilevered support plate 91.

Applicant has found that in operation, the material conveyor and spreader herein disclosed provides a more even delivery and dispersal of the material than known spreaders of the same type. The angled shaped of expanded Z-shaped bars reduces the effective distance between the bars whereby, although a flight 45 is provided at only every other link 31, the material pauses during delivery are reduced in an amount even greater than would be attained by providing a conventional flight at every link. The present conveyor can be run at a desirable slow speed at high power whereby a full width door can be used thereby reducing the possibilities of jamming of the material. The increased number of fins on the spinner 14 also allows the spinner to be rotated at a slow speed commensurate with a controllable and desirable spread pattern while at the same time causing the fins to pass the material drop box with sufficient frequency to effect a very even and uniform spread of the material.

The conveyor of the present invention can be operated in either a forward or rearward direction. This is very effective in breaking up the material when the same becomes overly compacted and also makes the present invention adaptable to spread from either end of the hopper 11. As shown in broken lines in FIG. 1, a spinner 14' and a material drop box 13' may be provided adjacent to the forward end of the hopper which would, in that case, be provided with a door opening 50 and a door 51 the same as disclosed at the rearward end of the said hopper.

We claim:

1. A material conveyor and spreader adapted to be mounted upon a vehicle for spreading granular material uniformly on a roadway, said material conveyor and spreader comprising a hopper having a discharge end; a chain and flight type conveyor mounted in the bottom of said hopper for delivering material toward said discharge said discharge end of said hopper having an opening; one end of said conveyor being disposed adjacent to said opening for delivering the material out of said hopper; said conveyor comprising parallel, endless chains transversely connected by flights; each flight comprising a bar connected at the ends thereof to respective of said chains and adapted to cut through the material and move said material toward said opening; each said bar having certain material contracting surface portions thereof disposed adjacent to the transverse centerline of said flights, other material contacting surface portions disposed forwardly of said transverse centerline line in the direction of conveyor travel, and still other surface portions disposed rearwardly of said transverse centerline opposite to the direction of conveyor travel whereby said flights deliver material at said discharge end of said hopper in a substantially continuous flow.

2. A material conveyor and spreader as set forth in claim 1 said bars being of substantially Z-shape form.

3. A material conveyor and spreader as set forth in claim 2: each said Z-shape bar being connected to said chains at points located transversely opposite to each other across said conveyor; each said bar having a relatively long central portion and relatively shorter end portions; each said portion being skewed with respect to a line transverse to the longitudinal centerline of said conveyor; said end portions being oppositely angled with respect to said central portion in the plane of said conveyor, the intersections of said central portion in the plane of said conveyor, the intersections of said central portion and said end portions providing apices which project forwardly and rearwardly beyond the transverse centerline of each flight.

4. A material conveyor as set forth in claim 3: each said Z-shape bar being symmetrically formed with respect to said transverse centerline of said bar whereby the material is conveyed by said bars with equal facility in either direction of said conveyor.

5. A chain and flight type conveyor adapted to be mounted in a hopper for conveying granular material toward one end of the hopper, said conveyor comprising a pair of parallel, endless chains rotatably mounted at either end of said conveyor on sprockets; each said endless chain comprising a plurality of connected links; certain of said links of one chain being connected to certain of said links of the other said chain by flights; each flight comprising a bar having portions thereof disposed obliquely with respect to a line transverse to the longitudinal centerline of said conveyor whereby the material is moved at one end of each said portion ahead of material moved at the other end of said portion to cause said material to be delivered at the discharge end of said conveyor in a substantially continuous flow.

6. A chain and flight type conveyor as set forth in claim 5: said bars being of expanded Z-shape form.

7. A chain and flight type conveyor adapted to be mounted in the bottom of a hopper for delivering granular material toward one end of the hopper, said conveyor comprising a pair of parallel, endless chains rotatably mounted at either end of said conveyor on sprockets; each said endless chain comprising a plurality of connected links; said chains being connected transversely by flights each of which comprises an expanded Z-shaped bar connected to links located transversely opposite to each other across said conveyor; each said bar having a relatively long central portion and relatively shorter end portions, each portion being skewed with respect to a line transverse to the longitudinal centerline of said conveyor, said end portions being oppositely angled with respect to said central portion in the plane of said conveyor, the intersections of said central portion and said end portions providing apices which project forwardly and rearwardly beyond the transverse centerline of each flight whereby material is moved at one end of each said portion ahead of material moved at the other end of said portion to cause said material to be delivered at the discharge end of said conveyor in a substantially continuous flow.

8. A material conveyor and spreader adapted to be mounted upon a vehicle for spreading granular material uniformly on a roadway, said material conveyor and spreader comprising a hopper having a discharge end; a chain and flight type conveyor mounted in the bottom of said hopper for delivering material toward said discharge end; said discharge end of said hopper having an opening; one end of said conveyor being disposed adjacent to said opening for delivering the material out of said hopper; said conveyor comprising parallel, endless chains transversely connected by flights; each flight comprising a bar connected at the end thereof to respective of said chains and adapted to cut through the material and move said material toward said opening; each said bar having different portions of the length thereof oppositely obliquely angled with respect to the direction of conveyor travel whereby the most forwardly projecting portion of one said flight is substantially closer, in the direction of conveyor travel, to the most rearwardly projecting portion of the forwardly adjacent flight than the transverse centerlines of said flights are to each other whereby said portions of said bars approach the material at an angle and deliver material at said discharge end of said hopper in a substantially continuous flow.

UNITED STATES PATENT OFFICE
CERTIFICATE OF CORRECTION

Patent No. 3,610,474      Dated October 5, 1971

Inventor(s) Charles S. Usher and John A. Keller

It is certified that error appears in the above-identified patent and that said Letters Patent are hereby corrected as shown below:

Claim 1, column 5, line 58, after "said discharge" (first occurrence) insert ---end; ---

Claim 3, column 6, lines 7 and 8, cancel the following "the intersections of said central portion in the plane of said conveyor,"

Signed and sealed this 25th day of April 1972.

(SEAL)
Attest:

EDWARD M. FLETCHER, JR.      ROBERT GOTTSCHALK
Attesting Officer      Commissioner of Patents